No. 715,251. Patented Dec. 9, 1902.
P. H. EMLEY.
BERRY PICKER.
(Application filed Mar. 27, 1902.)
(No Model.)
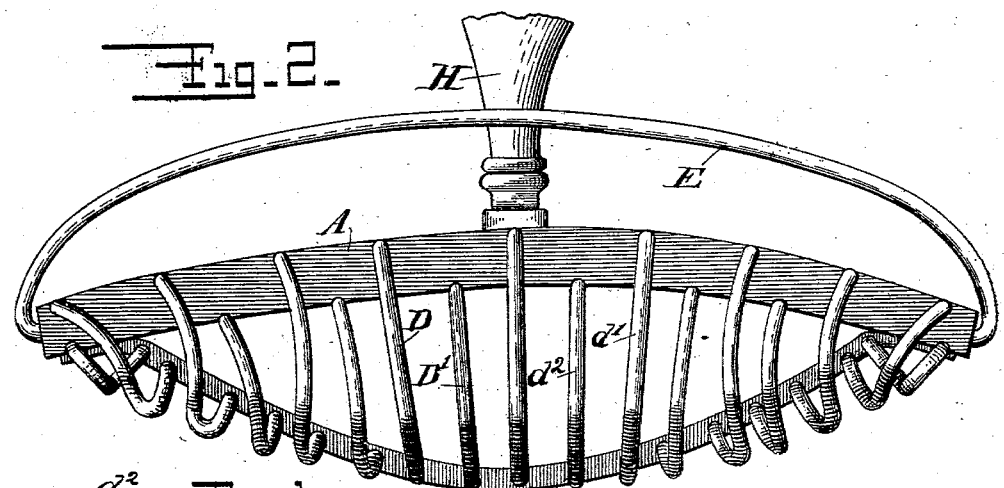
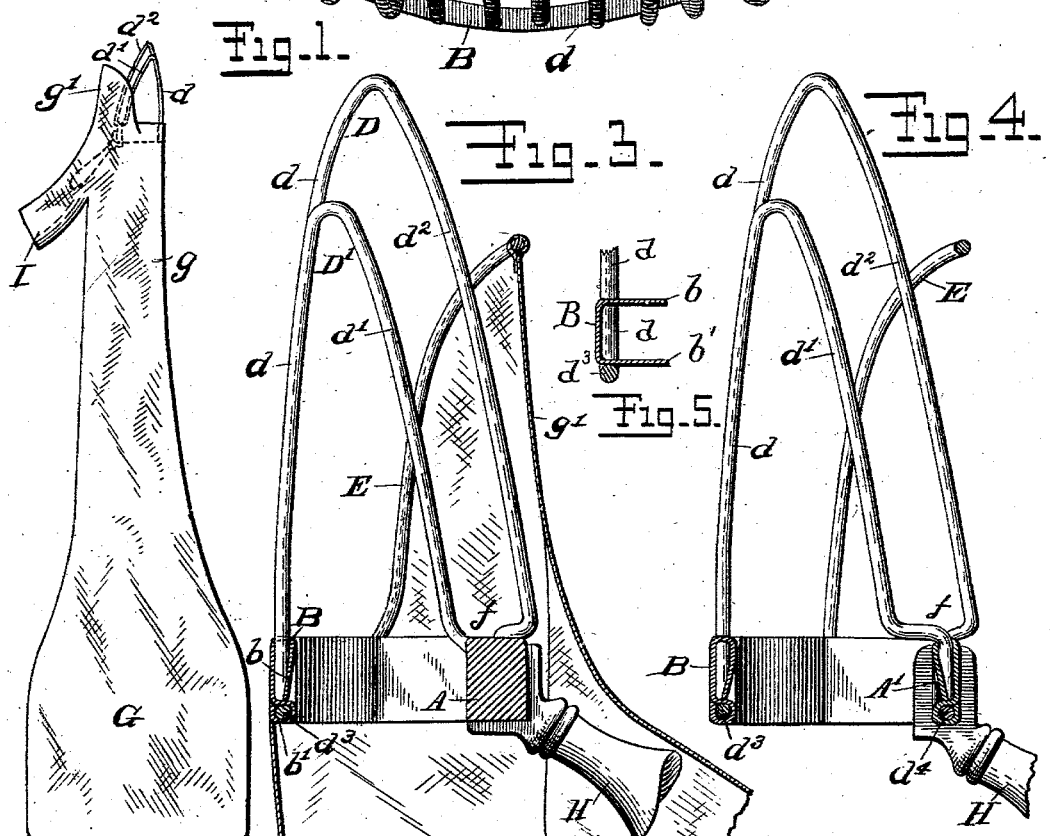
WITNESSES
J. B. McGirr
D. A. Pauling
INVENTOR
Peter H. Emley
by Gifford & Bull
his attys.

UNITED STATES PATENT OFFICE.

PETER H. EMLEY, OF LAKEHURST, NEW JERSEY.

BERRY-PICKER.

SPECIFICATION forming part of Letters Patent No. 715,251, dated December 9, 1902.

Application filed March 27, 1902. Serial No. 100,200. (No model.)

*To all whom it may concern:*

Be it known that I, PETER H. EMLEY, a citizen of the United States, and a resident of Lakehurst, in the county of Ocean and State of New Jersey, have invented a new and Improved Berry-Picker, of which the following is a full, clear, and exact description.

My invention relates to an improvement in devices to be used in picking berries, and comprises the novel parts and combinations of parts, which will be hereinafter described and particularly pointed out in the claims.

Figure 1 is a side view of my device complete. Fig. 2 is a front or end view of the picking device separated from the bag for holding the berries; and Figs. 3 and 4 are longitudinal sectional views through the same part, showing slightly different constructions. Fig. 5 is a detail enlarged view of a part of the structure shown in Figs. 3 and 4.

My invention consists of a small device which may be operated with one hand and is therefore adapted to use in all sorts of places and under all conditions which are apt to be met.

The drawings accompanying herewith illustrate my invention in the form which is now preferred by me.

My invention consists of two principal parts—the picker proper and the bag which is connected therewith, so as to receive the berries as they are removed from the bush or vine by the picker. The picker members consist of the wires D and D', which are supported from a frame consisting of the two bars A and B, which are separated between their extremities, so as to leave an opening for the discharge of the berries when removed from the bushes or vines into the neck $g$ of a storage-bag G. The frame which supports the picker members D and D' may be of any desired shape, which will properly support said picker members and provide for the discharge of the berries into the bag. In Figs. 2 and 3 the bar A is shown as of wood, while the bar B is shown as composed of sheet metal suitably bent and perforated to receive and hold the wires forming the picker members. These picker members are divided into two sets D and D', both of which have their lower or berry-removing portions $d$ lying in substantially the same curved surface. These wires are secured at one end to the bar B and are bent backward and secured by their other ends to the bar A. The bend in the set D' of these wires is at a shorter distance from the bars A and B than is the corresponding bend in the set D. The return portions $d'$ and $d^2$ of these wires, which are connected with the bar A, lie in different planes or curved surfaces or when viewed in cross-section appear staggered and lie in two parallel rows. The lower portions $d$ of both sets, however, lie in a single row. In consequence of this the openings between the wires upon the upper side of the device are considerably greater than the openings between the wires upon the lower side of the device. Berries may therefore freely enter between the wires on the upper side which would be removed by engagement with the wires upon the lower side.

In use the device would be held in an inclined position, so that the berries which are removed by the parts $d$ of the wires will roll through the space between the bars A and B into the neck $g$ of the storage-bag G. To prevent berries falling out between the parts $d$ and $d^2$ when the device is held in an upright position, such as is shown in Figs. 3 and 4, which would often occur in use, I provide a wire or bar E, which extends across and just over the upper side of the device and to which the upper end of the bag or an extension $g'$ thereof is secured, thus forming a screen or guard to prevent discharge of the berries at this side after they have once entered the same.

It will be noticed that the wires $d'$ and $d^2$ at $f$ where they emerge from the bar A are alternately bent upward and downward, so as to bring the said wires $d'$ and $d^2$ into different planes. The fingers composed of a wire $d$ and a wire $d'$ or $d^2$, as the case may be, need not be each composed of a separate and independent wire; but adjacent fingers or a series of fingers may be made of the same wire, said wire being bent in a loop, as shown at $d^3$, connecting adjacent fingers. The manner of making this bar is shown in Fig. 5, which represents a section of the bar before it is completed. It is first a U-shaped channel having holes through which the wires forming two adjacent fingers are inserted. After the wires are inserted the two flanges or sides $b$ and $b'$ are bent downward or upon the wires, the flange $b$ being preferably indented between the wires and the flange $b'$ being bent about the bend $d^3$, connecting the parts of the wires forming adjacent fingers, thus securely binding the wires in place. In Fig. 4 the bar A is shown as of a similar construction.

To provide a convenient method of emptying the bag, I provide a discharge-spout I, which connects with the neck of the bag near its upper end and upon the upper side thereof, so that the berries will not be discharged therefrom during the act of picking. When it is desired to discharge the bag, it is reversed and held with this spout downward over a receiving vessel. For convenience in use I provide a handle H, which is attached to the bar A. This handle is shown as within the discharge-spout I, but may be outside thereof, if desired. As the spout is of cloth it will not interfere with the convenient use of the handle. In fact, with the handle inside the spout the hand will naturally and without effort keep the spout closed.

In use the picker is held at any angle desired between the horizontal and vertical and is drawn over the bushes or vines, so as to pass them between the fingers thereof, as a comb is drawn through hair. The fingers are so spaced that the vines or twigs with the leaves thereon will pass freely between both sides thereof, while the berries will be caught by the portions $d$ thereof and pulled off and roll into the bag G. The neck of the bag is preferably made long, so that the body of the bag may rest on the ground and permit the picker being used at considerable distances on all sides thereof without moving the bag.

The portions $d'$ and $d^2$ of the fingers form efficient braces or supports for the outer ends of the berry-removing portions $d$. They also serve to straighten out the vines and prevent their catching in the more closely-spaced portions $d$ and also by their inclined direction relatively to said portions $d$ act to deflect portions of vines which extend transversely of the fingers. If the teeth $d$ were of sufficient strength, it would be possible to dispense with the sides $d'$ and $d^2$, the shield $g'$ preventing the escape of the berries after the teeth $d$ have removed them. I prefer, however, to make the teeth as shown.

Having thus fully described my invention, I claim as new and desire to secure by Letters Patent—

1. A berry-picker having a series of fingers each composed of a wire or bar bent upon itself to form separated sides, one side of all said fingers lying in a common surface while the opposite sides of alternate fingers lie in surfaces which are removed therefrom at different distances.

2. A berry-picker having a series of fingers each composed of a wire or bar bent upon itself to form separated sides, one side of all said fingers lying in a common surface while the opposite sides of alternate fingers lie in surfaces which are removed therefrom at different distances, and a frame supporting said fingers and having a berry-discharge opening.

3. A berry-picker having a series of fingers each composed of a wire or bar bent upon itself to form separated sides, one side of all said fingers lying in a common surface while the opposite sides of alternate fingers lie in surfaces which are removed therefrom at different distances, a frame supporting said fingers and having a berry-discharge opening, and a berry-receiver connected with said opening.

4. A berry-picker having a series of fingers each composed of a wire bent upon itself to form two legs, one leg of all fingers lying in a common surface while the other legs are arranged in a zigzag or staggered manner.

5. A berry-picker having a series of fingers each composed of a wire bent upon itself to form two legs, one leg of all fingers lying in a common surface while the other legs are arranged in a zigzag or staggered manner, and a berry-receiver attached thereto.

PETER H. EMLEY.

Witnesses:
　DAVID NOYES,
　LEON A. EMLEY.